Patented May 8, 1951

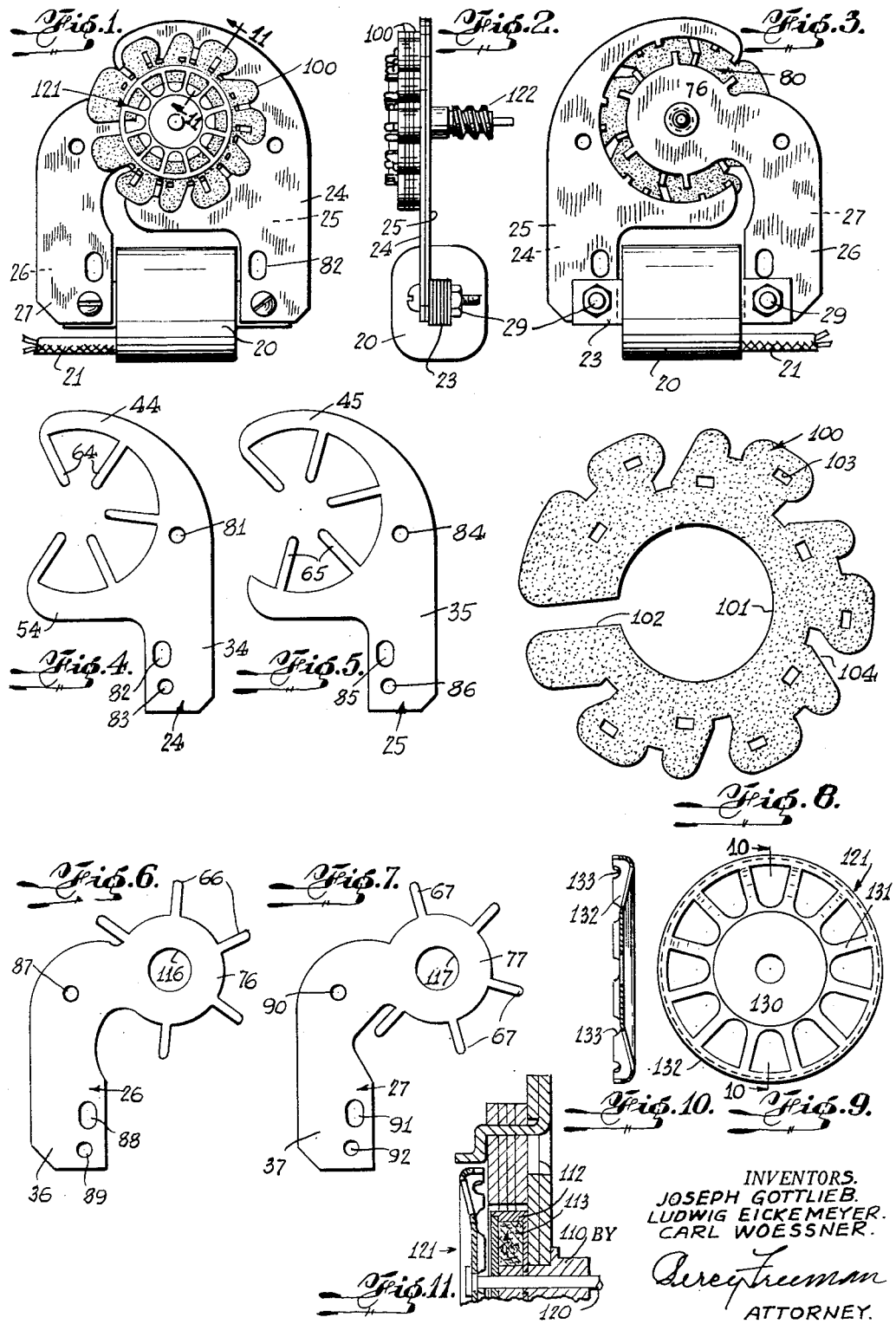

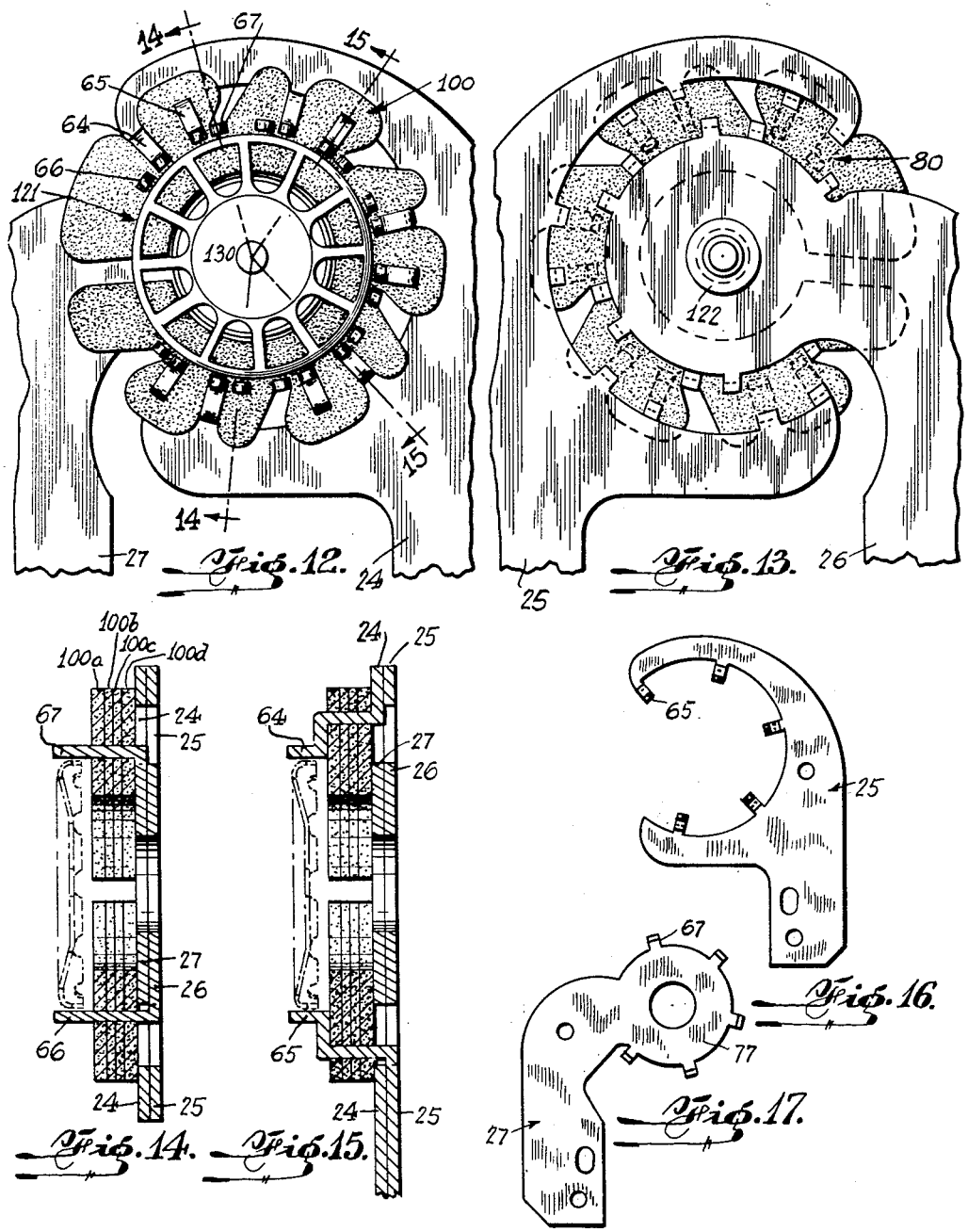

2,552,315

UNITED STATES PATENT OFFICE

2,552,315

SELF-STARTING SYNCHRONOUS ELECTRIC MOTOR

Joseph Gottlieb, Jersey City, Ludwig Eickemeyer, Union, and Carl Woessner, Bloomfield, N. J., assignors to Gibraltar Manufacturing Co., Inc., Jersey City, N. J., a corporation of New Jersey Application January 21, 1949, Serial No. 71,902

7 Claims. (Cl. 172—278)

This invention relates to a self-starting synchronous electric motor for clocks and the like.

The principal object of this invention is the provision of a self-starting synchronous motor in which a plurality of field poles is arranged in a common circle surrounding the rotor, said field poles being all integral with a laminated field construction. In this invention the stator is laminated so that its several component parts may be stamped out of sheet metal at relatively low cost and with uniform precision. Fingers are provided on said stator and they are bent outwardly in a generally common direction to align them on a common circular line which surrounds and is concentric with the rotor. These fingers serve as the field poles of the motor and as many fingers may be provided as field poles are required.

Another object of this invention is the provision of a self-starting synchronous motor having the type of stator which is above described and which is provided with a shield between the laminations and the rotor, said shield being held in place on said laminations solely by the very fingers which constitute the field poles of the motor. The shield is also laminated so that it may be stamped out at low cost and with great, uniform precision. It has a plurality of slots and other openings formed therein to accommodate the fingers of the laminated stator. Some of these fingers are bent over upon said laminated shield to fix it in place relative both to the stator and to the rotor, and by the same token, these bent fingers also serve to unite all parts of the stator into an integral whole.

Another important object of this invention is the provision of a rotor which is so designed as to render the motor in which it is incorporated both self-starting and synchronous. This rotor is also stamped out of sheet metal for great economy in production as well as unusually great and uniform precision. It has a continuous rim for its self-starting properties and notches of controlled shape and depth are provided in said rim to enable the rotor to lock into cycle. The rotor is provided, in its preferred form, with twelve spokes, but six spokes or any multiple of six may be used to good advantage.

A further object of this invention is the provision of a rotor as above described which is dished in shape to enable the flux to pass unimpeded across the center of the rotor. In this design the continuous rim lies on a given plane and the spokes and hub of the rotor are offset from said plane.

These and other objects are attained by mechanism illustrated in the accompanying drawing, in which:

Fig. 1 is a front view of the entire mechanism.
Fig. 2 is a side or edge view thereof.
Fig. 3 is a back view of said mechanism.
Fig. 4 is a plan view of one of the laminations which comprise the stator.
Fig. 5 is a plan view of a second lamination.
Fig. 6 is a plan view of a third lamination.
Fig. 7 is a plan view of a fourth lamination.
Fig. 8 is a plan view of the shield.
Fig. 9 is a plan view of the rotor.
Fig. 10 is a diametric section therethrough on the line 10—10 of Fig. 9.
Fig. 11 is an enlarged, fragmentary sectional view through the stator, rotor and shield on the line 11—11 of Fig. 1.
Fig. 12 is an enlarged, fragmentary front view of the mechanism.
Fig. 13 is an enlarged, fragmentary back view thereof.
Fig. 14 is a section on the line 14—14 of Fig. 12.
Fig. 15 is a section on the line 15—15 of Fig. 12.
Fig. 16 is a view of the lamination of Fig. 5 with its fingers bent to form field poles.
Fig. 17 is a view of the lamination of Fig. 7 showing its fingers bent to serve as field poles.

The synchronous motor shown in the drawing includes a field coil 20 which may be connected by means of conductor 21 to a source of alternating electric current. Extending through the coil is a core 23 which is magnetized in accordance with the direction of flow of the current through said coil. Laminations 24, 25, 26 and 27, shown respectively, in Figs. 4, 5, 6 and 7, are affixed to core 23 by means of bolts 29. More specifically, laminations 24 and 25 are placed flat against each other and are affixed to the one side of the core, as seen in Fig. 3, and laminations 26 and 27 are placed flat against each other and fastened to the other side of the core as seen in said figure. Laminations 24 and 27 occupy a common plane and they are disposed in face-to-face relation with laminations 25 and 26, which also occupy a common plane.

Reference to Figs. 4 and 5 will disclose the fact that laminations 24 and 25 are provided, respectively, with upright portions 34 and 35. Lamination 24 has arms 44 and 54 formed on said upright portion and fingers 64 formed on and extending radially inwardly from said arms. Lamination 25 is provided with corresponding arms 45 and 55 on its said upright portion 35 and fingers 65, slightly longer than fingers 64, are formed on its said arms 45 and 55. Arms 44 and 54 define the greater part of a circle or circular space between them as do arms 45 and 55. Fingers 64 and 65 extend radially of their respective arms. When laminations 24 and 25 are placed flat upon each other, they coincide in their respective upright and arm portions but their fingers are staggered with respect to each other.

Laminations 26 and 27 are also provided with upright portions 36 and 37 respectively, but instead of having a pair of arms connected thereto to define a circular space therebetween, these upright portions 36 and 37 are connected to ring-shaped portions 76 and 77 respectively. Fingers 66 extend outwardly from, and radially of, ring-shaped portion 76 and fingers 67, which are shorter than fingers 66, project outwardly from, and radially of, ring-shaped portion 77. When laminations 26 and 27 are placed flat upon each other, they coincide substantially in every respect except that their fingers are staggered with respect to each other.

It will hereinafter more fully appear that when the motor is completely assembled, fingers 64, 65, 66 and 67 are bent at right angles to the planes on which their respective laminations extend. When these fingers are so bent, it is possible to position the several laminations in such manner that the ring-shaped portions 76 and 77 of laminations 26 and 27 occupy a central position in the circular spaces defined by arms 45 and 55 of lamination 25 and arms 44 and 54 of lamination 24. A substantially annular space 80 is thereby formed between the arms of laminations 24 and 25 on the one hand and the ring-shaped portions of laminations 26 and 27 on the other hand. It is through this annular space that fingers 64, 65, 66 and 67 extend when they are bent perpendicularly with respect to the several laminations. This annular space prevents any excessive loss of magnetic flux between the laminations 24—25 and laminations 26—27.

It will be noted that laminations 24 and 25 are provided with openings 81, 82 and 83 and with openings 84, 85 and 86 respectively. These openings register with each other when the two laminations are superposed, one on the other. Openings 83 and 86 accommodate one of the screws 29, and the other openings accommodate other members of the clock mechanism to which the motor is attached. More specifically, they are intended to accommodate fastening members designed to support the motor relative to said clock mechanism. Similar openings 87, 88 and 89 are formed in lamination 26 and registering openings 90, 91 and 92 are provided in lamination 27. Openings 89 and 92 are adapted to accommodate the second of the two bolts 29.

Shield 100 is of copper or other suitable material and has the general shape which is best shown in Fig. 8. It is substantially ring-shaped although it does not extend a full 360°. It has a substantially circular opening 101 formed therein and a radially extending slot 102 is formed in said ring-shaped shield to provide communication between said circular opening 101 and the outside of the shield, thereby breaking or interrupting the ring which said shield describes. A plurality of openings or holes 103 is formed in said shield and it will be noted that these holes lie on two concentric circles which are themselves concentric with central opening 101. In addition to these holes 103, slots 104 are formed in said shield, terminating in portions which resemble the configuration of holes 103 and it will be seen that these inner portions of slots 104 lie on a circular line which coincides with the inner circle on which some of the holes 103 are disposed. Slots 104 do not extend radially of central opening 101 but instead they are virtually tangential thereto. Holes 103 and said inner portions of slots 104 are so arranged and spaced as to enable them to accommodate the fingers of stator laminations 24, 25, 26 and 27, when said fingers are bent perpendicularly with respect to said laminations.

It will be recalled that shield 100 itself constitutes a plurality of superposed laminations. See Figs. 14 and 15 where the shield is shown to comprise laminations 100a, 100b, 100c and 100d. Lamination 100a may be considered to be the front lamination and 100d the back lamination.

When the motor is assembled, laminated shield 100 rests against front laminations 24 and 27 in the manner shown in Figs. 14 and 15. It will be seen in Fig. 14 that the fingers of laminations 26 and 27 extend through holes 103 which lie on the inner circle above mentioned, and it will be understood that they also extend through the inner portions of slots 104. On the other hand fingers 64 and 65 of laminations 24 and 25 extend through the outer circle of holes 103. In the embodiment shown, these last-mentioned fingers are bent at their outwardly extending ends to form substantially L-shaped portions wherein the foot portions of said L-shaped portions rest against the outer shield lamination 100a and the upright portions of said L-shaped portions are aligned with the inner circle of fingers, to wit, those fingers which are connected to laminations 26 and 27.

The L-shaped portions of fingers 64 and 65 serve as anchors with respect to the laminated shield, holding said shield in position with respect to laminations 24 and 25 and fingers 66 and 67 serve to position said laminated shield with respect to laminations 26 and 27. To the extent that these L-shaped portions are on the back lamination 25, they serve to hold the two laminations 24 and 25 together as well as to hold the shield 100 together with said laminations.

Specifically, we have shown fingers of stator laminations 24, 25, as being bent near their outer ends to serve as anchors and to be aligned with the inner circle of fingers on 26, 27, but it should be understood that the fingers on laminations 24, 25 may be straight and instead that the fingers on laminations 26, 27 may be bent over the shield and their ends aligned with the outer circle of fingers on 24, 25; or the fingers in both the inner and the outer ring may be bent over the copper shielding to align in a common circle in between both rings of fingers. By bending the fingers over the copper shielding, a complete unit is formed without the use of screws or rivets or such other independent fastening means.

A bearing 110 is mounted in the openings 116 and 117 of ring-shaped portions 76 and 77 of laminations 26 and 27. Connected to said bearing, and assisting in holding said bearing in said openings, is a lubricating box 112 which contains a quantity of lubricating material 113. The bearing may be made of powdered metal such as the types known as graphited metals to provide adequate lubrication not only by virtue of the fact that it is conductive of the lubricant contained in lubricating box 112.

Journalled in bearing 110 is the shaft 120 on which rotor 121 is fixedly mounted. This shaft is also the drive shaft by which the motor drives the clockwork mechanism. It may have a worm 122 mounted thereon, as shown in Fig. 2 to engage a worm wheel (not shown) in the clock mechanism. When rotor 121 is mounted on said shaft 120, it lies within the circle of outwardly projecting fingers 64, 65, 66, and 67. This circle of fingers is concentric with the rotor and as has above been indicated, the fingers serve as field poles relative thereto.

It will be seen in Figs. 9 and 10 that the rotor is a wheel-shaped member having a hub 130, a plurality of spokes 131 extending outwardly, radially from said hub, an endless rim 132 connected to the outer ends of the spokes and a plurality of notches 133 formed in said endless rim. This wheel-shaped rotor is dished to offset its hub and spoke portions from the plane on which the endless rim is disposed. See Fig. 10. There are as many notches 133 as there are spokes 131 and these notches alternate with the spokes so that each pair of spokes has a notch between them. The spokes are uniformly spaced from each other and the notches are uniformly spaced from each other as well as from said spokes. It will be noted in Figs. 10 and 11 that that portion of the rim in which the notches are formed extends substantially at right angles to the plane of the rim. It will further be noted that these notches are arcuate in shape. The width of the rim and the depth and width of the notches are determinative of important aspects of the performance of the motor. As has above been stated, an endless rim of appropriate width endows the motor with its self-starting properties. A sufficient number of notches of appropriate depth and width enables the motor to lock into the cycle of the alternating electric current which energizes it.

The principle of operation of the above described motor is clear. The inwardly turned fingers serve as field poles relative to the rotor and cause the rotor to rotate at a given speed which bears a direct relation to the number of cycles of the electric current to which the field coil is connected.

It will be appreciated that the foregoing is descriptive solely of a preferred form of this invention, and that form may be modified in many ways within the broad scope of the invention. Illustrative of the materials of which the above-described parts may be made is the following: the rotor may be made of spring steel, the laminations may be made of cold rolled steel, and the shield may be made of copper.

Having thus described our invention, what we claim as new and desire to secure by Letters Patent, is:

1. An electric motor of the character described comprising in combination a core, an excitation coil on said core, a rotor, a stator having a plurality of primary poles and shaded poles and consisting of a first and second half each composed of two plates, the plates of one stator half being connected to one end of said core and the plates of the other stator half to the other end of the core, the plates of said first stator half having an opening for containing the plates of said second stator half in the same plane, the primary poles being formed by a ring of teeth bent out of the plane of one plate of each stator half, and the shaded poles being formed by a ring of teeth bent out of the plane of the other plate of each stator half in such manner that the ring of poles from said first stator half is disposed on a first cylindrical surface and the ring of poles from said second stator half is disposed on a second cylindrical surface which is embraced within said first cylindrical surface.

2. A motor as set forth in claim 1 and comprising a common laminated ring-shaped short-circuiting element surrounding the teeth of the shaded poles.

3. A motor as set forth in claim 2 and in which the teeth formed from the plate of each stator half remote from said short-circuiting element is secured thereto thereby binding both pairs of stator plates to said element.

4. A motor as set forth in claim 3 and in which at least one stator half is secured to the short-circuiting element by having the free ends of its pole teeth bent L-shaped with the foot portions resting against the outer short-circuiting lamination and the upright portions in the cylindrical surface of the other pole ring.

5. A motor as set forth in claim 1 and comprising a common laminated short-circuiting element surrounding the teeth of the shaded poles, said element being ring-shaped, having a substantially circular opening formed therein and a radially extending slot formed in said element to communicate between said opening and the outer edge of the element, a first and second ring of spaced slots formed in said element, said rings being concentric with one another and with said circular opening, no two of said slots lying along the same radius, said shaded pole teeth passing through said slots.

6. A motor as set forth in claim 5 and in which a first group of openings is formed in said short-circuiting element aligned with the outer ring of slots and located in alternating spaced relationship therewith, said openings having radial slots connecting each respectively with the outer edge of said laminated element, and a second group of openings is formed in said laminated element aligned with the inner ring of slots and located in alternating spaced relationship therewith, said second group of openings having slots substantially tangential to said circular opening connecting each respectively with the outer edge of said element, all of said slots and openings lying on independent radii of said laminated element.

7. A motor as set forth in claim 6 and in which said primary pole teeth pass through said first and second groups of openings.

JOSEPH GOTTLIEB.
LUDWIG EICKEMEYER.
CARL WOESSNER.

REFERENCES CITED

The following references are of record in the file of this patent:

UNITED STATES PATENTS

| Number | Name | Date |
|---|---|---|
| 2,015,042 | Reinhardt et al. | Sept. 17, 1935 |
| 2,018,677 | Kohlhagen | Oct. 29, 1935 |
| 2,212,782 | Lauffer | Aug. 27, 1940 |